Sept. 22, 1964 W. M. LEEDS ETAL 3,150,245

LIQUEFIED-GAS CIRCUIT INTERRUPTERS

Filed Sept. 13, 1957 4 Sheets-Sheet 1

WITNESSES

Edwin E. Bassler

Wm. B. Sellers.

INVENTORS
Benjamin P. Baker &
Winthrop M. Leeds
BY
Willard R. Crout
ATTORNEY

United States Patent Office 3,150,245
Patented Sept. 22, 1964

3,150,245
LIQUEFIED-GAS CIRCUIT INTERRUPTERS

Winthrop M. Leeds, Forest Hills, and Benjamin P. Baker, Monroeville, Pa., assignors to Westinghouse Electric Corporation, East Pittsburgh, Pa., a corporation of Pennsylvania Filed Sept. 13, 1957, Ser. No. 683,760
20 Claims. (Cl. 200—145)

This invention relates to circuit interrupters in general and, in particular, to liquefied-gas circuit interrupters.

A general object of the invention is to provide a circuit interrupter of more compact size and of a highly efficient construction, which will render considerably improved operation over the conventional types of circuit interrupters, as disclosed in the prior art.

As well understood by those skilled in the art, for decades of years various forms of compressed-gas circuit interrupters have been designed, constructed and operated on electrical systems. These compressed-gas circuit interrupters have varied all the way from early simple types of puffer devices, to the modern high-speed, compressed-gas circuit interrupter, whose gas reservoir chamber may contain pressurized gas at pressures of 500 pounds per square inch and upwards. It is, of course, obvious that the use of such compressed gas at such high pressures necessitates a large enclosing reservoir tank of adequate strength, which results in considerable expense and the use of large amounts of high-strength material.

It is proposed in the present invention to provide a new and improved circuit interrupter of a radically different type of construction. It is proposed to utilize circuit interrupters employing liquefied gas as the interrupting medium. This has the distinct advantage of reducing the size of the circuit interrupter, and perhaps more importantly, enabling the use of an operating mechanism of less powerful design, and hence, of considerable reduced size.

It is proposed to use a circuit interrupter employing a liquefied gas instead of merely compressed gas, so that the inherent latent potential energy of the liquefied gas may be employed. Thus, it is not necessary to compress the gas at the moment of arc interruption as is customary in the mechanically-operated puffer type of compressed-gas circuit interrupters. In addition, it is not necessary to utilize a large pressure reservoir, where compressed gas is stored, as is customary in the ordinary type of compressed-gas circuit interrupter. Instead, it is proposed to utilize suitable gas in liquefied form utilizing thereby the inherent latent potential energy of such liquefied gas, so that upon injection into the arc stream the heat of the arc will effect a vaporization, or a gasification of the liquefied gas. Thus, the reservoir for the liquefied gas may be of considerably reduced dimensions, and the entire circuit interrupter may be of considerably smaller size. Moreover, following the use of such liquefied gas for circuit interruption, it may subsequently function as a dielectric medium, in gaseous form, within the circuit interrupter to reduce the spacing between conducting parts at opposite potential. As a result, the liquefied gas may be used for two purposes, first to effect circuit interruption of the one or more arcs drawn during the interruption process, and secondly, as a gaseous dielectric medium, under pressure, to permit close spacing of the several component parts of the interrupter, and hence, bring about a drastic reduction in the overall dimensions of the circuit interrupter employing the principles of the present invention.

In United States Patent 2,757,261, issued July 31, 1956, and assigned to the assignee of the instant application, there is disclosed and claimed the use of sulfur hexafluoride gas as an interrupting medium. Also, in United States Patent 2,733,316, issued January 31, 1956, to the same assignee, there is disclosed and claimed, the use of selenium hexafluoride, which also is an interrupting medium of unusual properties. It is proposed here in the present invention, to utilize these and certain other gases in a liquefied form.

As will be more apparent hereinafter, the present invention is not confined to the use of liquefied $SF_6$ or $SeF_6$, which have demonstrated unusually effective interrupting performance, but the present invention broadly contemplates the use of other liquefied gases, that is, gases which can be liquefied at reasonable pressures at normal atmospheric temperatures. Naturally, however, the present invention excludes those gases which are not suitable for circuit interruption, or which have extremely poor dielectric properties. The present invention is confined to the use of gaseous mediums, which may be used to effect circuit interruption, and which gaseous mediums can be employed in a liquefied form. Examples of such other gases, which are liquefiable and are good circuit interrupters (though not as good as $SF_6$ and $SeF_6$), and hence which may be used for certain applications, are carbon dioxide $CO_2$, sulfur dioxide $SO_2$, thionyl fluoride $SOF_2$, perfluorobutane $C_2F_6$, octo-fluoropropane $C_3F_8$, dichlorodifluoromethane $CCl_2F_2$, trifluorochloromethane $CClF_3$, trifluorobromomethane $CF_3Br$, and perchlorylfluoride $ClO_3F$.

The work or energy required to liquefy any of the liquefiable gases set out in the preceding paragraphs is released from the liquefied gas upon its injection into the arc stream. Thus, it is unnecessary to depend upon a heavy puffer operating mechanism to effect rapid compression of a gas immediately prior to its injection into the arc, as disclosed in the prior art devices. This feature of the invention is very important for high current interrupters, as it is desirable to eliminate the necessity for providing the required heavy operating mechanism for the rapid compression of a large quantity of gas required for injection into high power arcs.

By an application of the principles of the present invention, one may utilize the work or energy put into the liquefied gas, during the process of liquefication thereof, in the ultimate circuit interrupter installation, so that only a light operating mechanism may be employed; and the overall dimensions of the resulting circuit interrupter may be at a minimum.

An object of the present invention is to provide an improved circuit interrupter in which a liquefied gas is injected into the arc stream in an improved manner.

Yet another object of the present invention is to provide an improved circuit interrupter in which the arc is established closely adjacent to a place where liquefied gas may be injected, so that the liquid will not have a chance to assume its gaseous form prior to injection into the arc stream, which would be the case if a considerable distance existed from the point of injection into the arc stream.

Still a further object of the present invention is to provide improved means for maintaining a relatively high liquid pressure during low-temperature ambient operation of a liquefied gas circuit interrupter.

Still a further object of the present invention is to provide a suitable gas for maintaining pressure upon the surface of a liquefied gas, so that the latter may be employed at high pressure for injection into the arc stream.

Still a further object of the invention is to provide a mechanical piston-type impulse driving means for forcing liquefied gas at high pressure toward the arc zone.

Another object is to provide an improved circuit interrupter utilizing a liquefied gas, in which the liquid may be injected into the arc stream for circuit interruption, and the vapor pressure over the liquid surface may be employed for effecting operation of the contact operating means.

Another object of the invention is to provide an improved circuit interrupter in which the arc is established in a pool of the liquefied gas. In certain applications, an interrupting structure may be situated at least partially in the pool of the liquefied gas, so as to enable a more effective interrupting operation to be obtained.

Still a further object of the invention is to provide an improved circuit interrupter utilizing a heating means for maintaining the vapor pressure of the liquefied gas at a level suitable for maintaining the liquefied gas under sufficient pressure for proper injection into the arc stream for efficient circuit interruption.

Yet another object of the invention is to employ a current-responsive master valve in the liquid line leading from the liquid reservoir to the interrupting zone.

Still a further object of the invention is to provide an improved operating means for synchronizing the injection of the liquefied gas into the arcing zone with the movement of the movable contact structure.

It is to be clearly understood that the present invention contemplates the injection of the liquefied gas into the arcing zone, as distinguished from interrupting devices which may utilize a remote source of gas under pressure, which source itself may contain a gas in equilibrium with its liquid phase.

As set out above, U.S. Patent 2,757,261 discloses and claims the use of gaseous $SF_6$ as an arc-extinguishing medium. There have been utilized many structures designed for the specific use of $SF_6$ gas as the interrupting medium. In practically all cases, an effort has been made to prevent the gas from changing to a liquid, which condition depends upon both temperature and pressure.

In the present invention, we propose the use of $SF_6$ liquid, or a mixture of $SF_6$ liquid, vapor and gas as the interrupting medium. We are not limiting ourselves to the use of the liquid as the interrupting medium, in that we propose to inject the liquid into the arc stream, where it may be converted into a vapor or a gas, even before it reaches the high-temperautre conducting arc. The general idea is that we propose to inject into the arc stream $SF_6$ in some form, at a measured or metered rate, comparable to optimum arc interrupting effectiveness, and allow the interaction of the end products and arc to follow the normal course.

As set out above, it is desired to claim the above advantages when using other liquefied gases, since other gases can be used if they can be liquefied at reasonable pressures at normal atmospheric temperature.

We have observed that when a 10" diameter cylinder 7" long, filled with $CF_6$ gas at 60 p.s.i.g. is discharged through a 50,000 ampere arc at the rate of its total contents in 1½ cycles, successful interruption is obtained. This is equivalent to approximately 12 cubic inches of liquid $SF_6$ for operation at normal temperature, or a rate of about 8 cubic inches per cycle, which should be sufficient if properly synchronized with the arcing period. It is another object of the invention to utilize a liquefied gas in accordance with the foregoing experimental discovery.

Futher objects and advantages will readily become apparent upon reading the following specification, taken in conjunction with the drawings, in which:

FIGS. 1–3 somewhat diagrammatically indicate various orifice forms which may be employed in conjunction with utilizing a liquefied gas injected into the arcing zone, the contact structure in each case being illustrated in the partially open-circuit position;

Figures 1, 2, 3, 4:
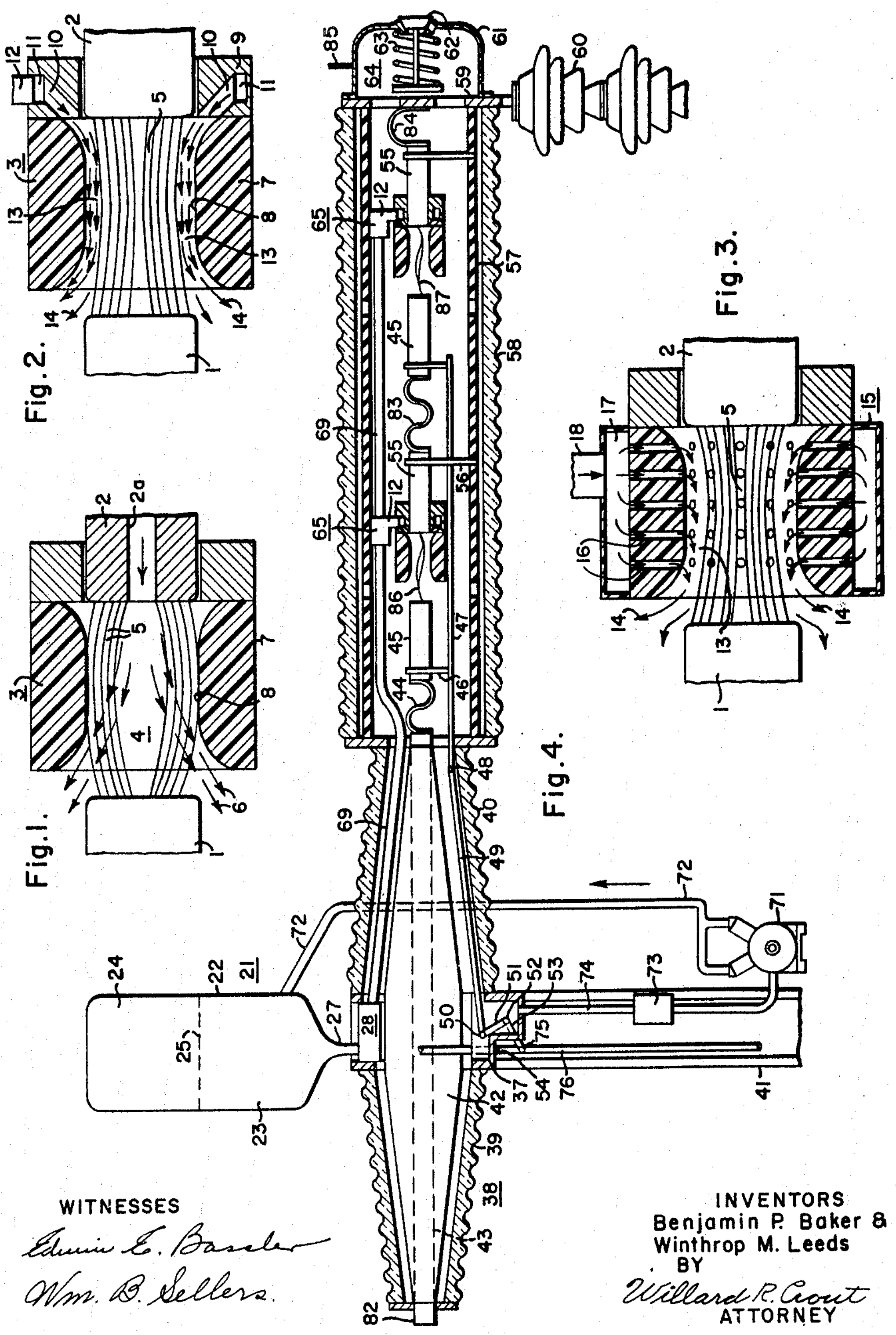
FIG. 4 is a somewhat diagrammatic vertical sectional view, with a part in side elevation, of a circuit interrupter utilizing the principles of the present invention, with the contact structure being illustrated in the partially open-circuit position.

Referring to the drawings, and more particularly to FIGS. 1–3 thereof, it will be observed that a movable contact 1 makes cooperable engagement with a relatively stationary contact 2 interiorly of a surrounding orifice structure, generally designated by the reference numeral 3. In FIG. 1, the stationary contact 2 is shown provided with a hollow passage 2*a*, through which a liquefied gas, such as liquid $SF_6$, passes under pressure. The liquefied gas is injected into the arcing region 4, and the lines 5 indicate the relative position of the arc. It will be observed that the arc 5, established between the separated contacts 1, 2, is extinguished by the entering stream of liquid $SF^6$ passing through the tubular stationary contact 2. Naturally, the high temperature conducting arc 5 vaporizes, or gasifies the entering liquid $SF_6$ stream with the resulting gaseous $SF_6$ exhausting around the movable contact 1 as indicated by the arrows 6. The orifice structure 3 in the interrupting arrangement of FIG. 1 includes a tubular insulating member 7 of polytetrafluoroethylene or polychlorotrifluoroethylene, having a centrally located restricted orifice portion 8, through which the arc 5 is drawn, and into which the liquefied $SF_6$ is injected.

FIG. 2 shows a somewhat similar arrangement in which, instead of the stationary contact 2 being tubular, a surrounding conducting ring-shaped guide member 9 is provided, having radially inwardly extending injector passages 10 provided therein. The injector passages 10 communicate with an annular manifold 11, which in turn is connected to an entering inlet tube 12. The inlet tube 12 is connected, in turn, to a source of a suitable liquefied gas, such as $SF_6$, $SeF_6$ or one of the previously mentioned liquefied gases.

With further reference to FIG. 2, it will be noted that here the arc 5 is established centrally along the orifice portion 8 of the orifice member 7, with the entering liquefied gas 13 passing thereabout longitudinally through the orifice 8 to exhaust about the movable contact 1 in the manner indicated by the arrows 14.

Attention may now be directed to the modified orifice structure 15, illustrated in FIG. 3, wherein a plurality of radially inwardly extending inlet passages 16 are provided communicating with a surrounding, annular-shaped manifold 17, the latter communicating with an inlet tube 18 carrying the entering liquefied gas, such as $SF_6$. Inlet passages 16 may be scattered in vertical planes or located in a single plane, so long as there are a sufficient number of them to prevent the arc from finding a position in the orifice where it cannot be sprayed with the incoming liquid. As was also the case in FIG. 2, the arc 5 is drawn centrally, longitudinally through the orifice structure 15 between the separated contacts 1, 2; and the entering liquefied gas 13 strikes the arc column 5 generally transversely thereof, circumferentially thereabout, and exhausts about the movable contact 1, as indicated by the arrows 14.

It will be observed that in all of the orifice structures, illustrated in FIGS. 1–3, that the entering liquefied gas 13 is effectively directed into the arc column 5, and maintains intimate contact therewith, as afforded by the presence of the surrounding orifice structures 3, 15.

Although FIGS. 1–3 show three possible types of orifice structures, it is to be clearly understood that other injector structures are available and, in fact, other devices, such as are utilized for injecting fuel into a combustion chamber, may be employed with the improved circuit interrupter of the present invention, it merely being necessary to provide effective contact of the entering liquefied gas with the arc column. In any case, the liquid or mixture of liquid, vapor and gas will be converted into an interrupting effort by the heat absorbed from the arc 5.

It will be apparent that since the pressure in the circuit interrupter of our invention may be only 45 p.s.i.g. for normal insulation, and since this pressure may rise to 150 p.s.i.g. in the arcing area during the life of a high current arc, the pressure developed in the injecting system should preferably be 300 or more p.s.i.g. The vapor pressure of $SF_6$ is 300 p.s.i.g. at about 70° F. As the temperature rises to 150° F., which should be the maximum operating temperature, the vapor pressure will reach 700 p.s.i.g. Also, if the ambient temperature falls to 25° F., the vapor pressure will drop to 150 p.s.i.g., which is the pressure in the arc area into which the $SF_6$ is to be discharged. Therefore, at low ambient temperatures some means of maintaning injecting pressure must be employed.

Figures 5, 6:
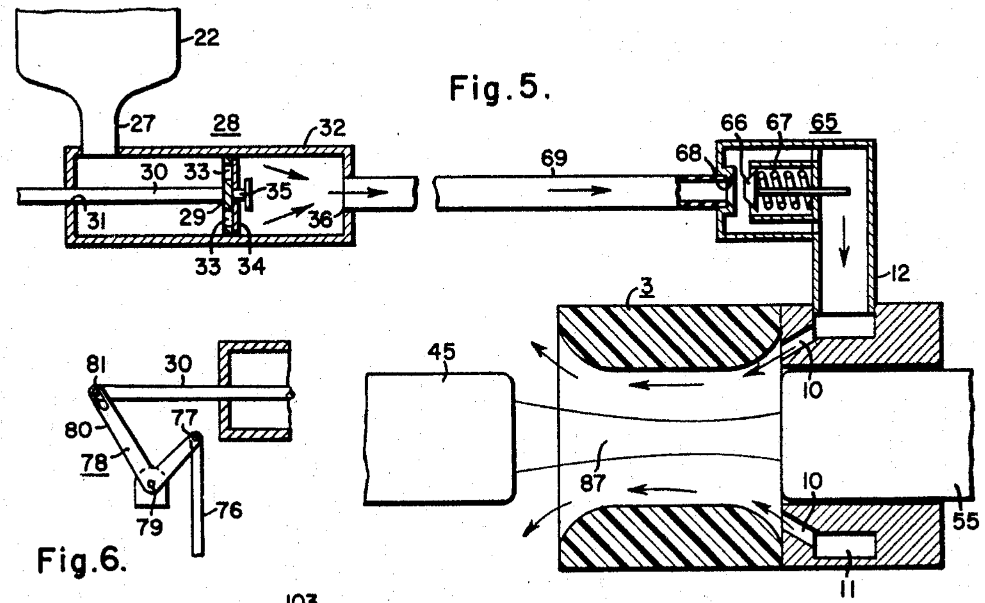
FIG. 5 is a fragmentary, enlarged, vertical sectional view through a portion of the circuit interrupter of FIG. 4, illustrating, to an enlarged scale, the injector or impulse piston and the relief valve, with the contact structure being shown in the partially open-circuit position.
FIG. 6 is a fragmentary, diagrammatic view illustrating how the impulse piston may be mechanically connected with the operating mechanism for the movable contact structure, so that liquefied gas is injected into the arc stream during the circuit opening operation.

To accomplish the maintaining of an adequate injecting pressure, it is proposed to employ the following methods:

(1) The use of a mechanically operated impulse device for measuring the fluid and forcing it into the arc path, as shown in FIGS. 4 and 5 hereinafter described.

Figure 7:
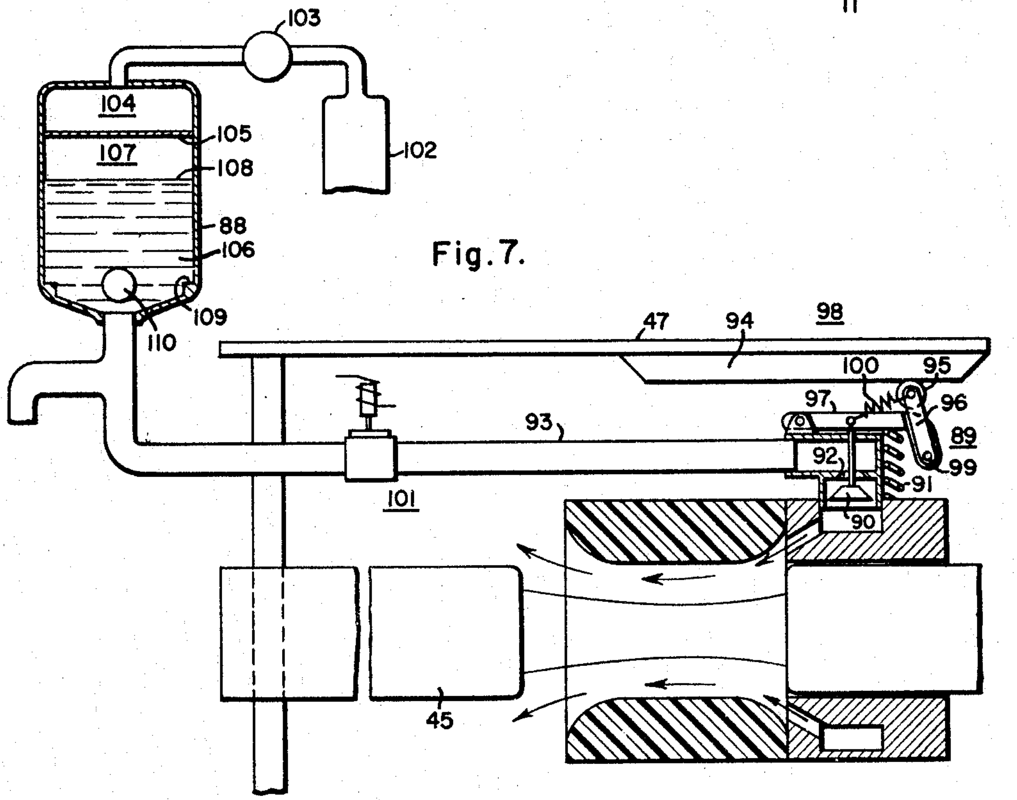
FIG. 7 is a diagrammatic view illustrating an alternative method of maintaining the pressure upon the liquefied gas to a sufficient level, so that it may be injected into the arc stream over a wide range of ambient temperature conditions, the contact structure being fragmentarily shown in the partially open-circuit position.

(2) The use of an accumulator with a gas, such as nitrogen $N_2$, in one end and sulfur hexafloride in the other, as illustrated in FIG. 7, hereinafter described.

Figure 8:
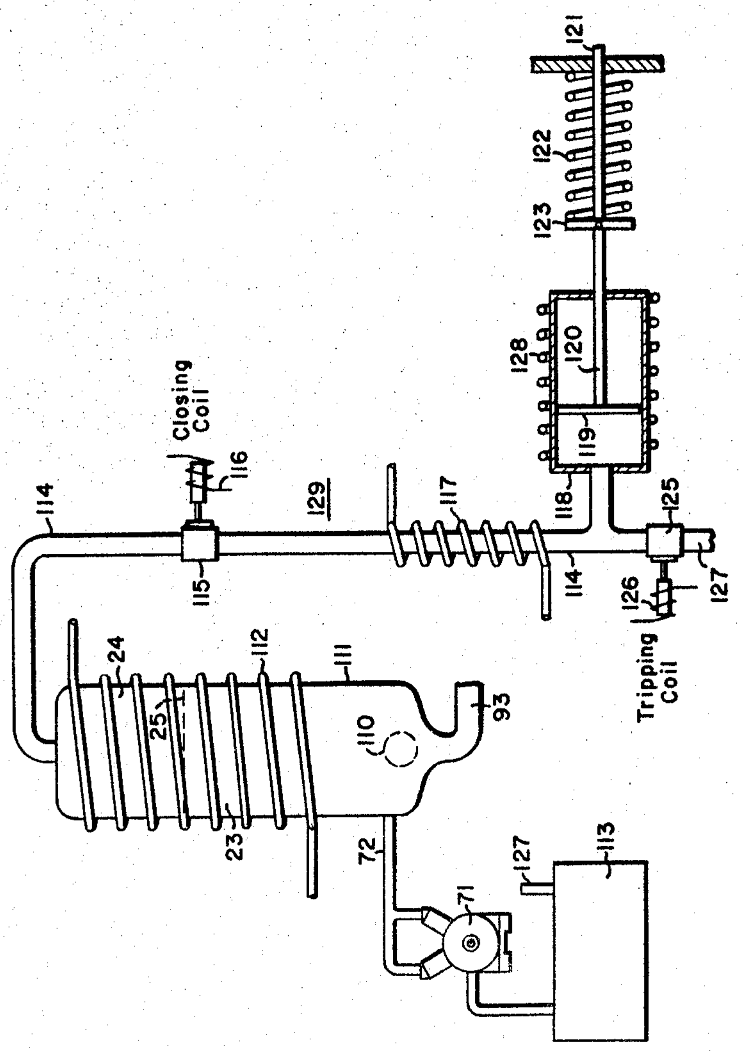
FIG. 8 is a fragmentary, diagrammatic view illustrating another method for maintaining the liquefied gas at a suitable pressure, and in addition, utilizing the vapor pressure for effecting contact operation.

(3) The use of $SF_6$ and a heater to maintain the temperature of the container at or above some suitable value, such as 70° F., as shown in FIG. 8, hereinafter described.

With reference to FIGS. 4–6, which illustrate the first method using a mechanical injection device, it will be observed that the circuit interrupter, generally designated by the reference numeral 21, includes an upstanding reservoir 22 containing, in this particular instance, $SF_6$ in the liquid phase, as indicated by the reference numeral 23, in equilibrium with the vapor phase of $SF_6$, as indicated by the reference numeral 24. The meniscus between the liquid and vapor phases 23, 24 is represented by the reference numeral 25. It will be noted that the vapor pressure within the reservoir 22 will vary from 20 p.s.i.g. to 700 p.s.i.g. as the ambient temperature about the circuit interrupter 21 varies from −40° F. to +150° F.

The lower end 27 of the reservoir 22 leads into an impulse piston device, generally designated by the reference numeral 28, and more clearely shown in FIG. 5 of the drawings. With reference to FIG. 5, it will be observed that an impulse piston 29 is carried at the end of a piston rod 30, the latter passing through an opening 31 provided at the left-hand end of an operating cylinder 32. The impulse piston 29 contains a plurality of apertures 33 therein, which are controlled by a ring-shaped, check-valve plate 34 carried on a pin 35 extending outwardly from the piston rod 30.

Thus, upon rightward, driving movement of the piston rod 30 during the opening operation of the interrupter 21, the valve plate 34 will close the openings 33 in the impulse piston 29, to thereby place the liquid $SF_6$ within the region 36 under a very high pressure, such, for example, as 1200 p.s.i.g. Upon the return closing movement of the piston rod 30, the valve plate 33 will uncover the apertures 33 to permit the region 36 to fill again with liquid from reservoir 22 preparatory for the next opening operation of the interrupter.

With further reference to FIG. 4, it will be noted that the impulse piston device 28 is located at the ground flange support 37 of a condenser bushing, generally designated by the reference numeral 38, and including a pair of oppositely extending, porcelain shells 39, 40 placed under compression by any suitable means, not shown. The ground flange support 37 is supported at the upper end of an upstanding framework 41, which may be formed from angle-iron supports.

The condenser bushing 38, in addition, includes a centrally disposed core 42, which may be formed from a wrapping of a paper-like material having conducting foils interspersed therein, to form the condenser layers for the bushing 38.

A terminal stud 43 extends longitudinally through the core 42, and is connected at its right-hand end, by a flexible connector 44, to a movable contact 45. The movable contact 45 is carried by an upstanding support 46, the latter being carried by a pair of longitudinally extending, insulating, operating rods 47. The pair of operating rods 47 are pivotally connected, as by means of pins 48, with insulating actuating rods 49, the latter being pivotally connected, as at 50, to an actuating crank 51. The crank 51 rotates about a fixed center 52, and has an external crank arm 53. The shaft 52 interconnecting the crank arms 51, 53 makes a gas-tight sealing connection with a casing 54. This shaft seal may assume the form as illustrated and claimed in U.S. patent application S.N. 576,875, filed April 9, 1956, by Harry J. Lingal, and assigned to the assignee of the instant application.

Certain features of the interrupter 21 are described and claimed in United States patent application filed December 6, 1957, S.N. 701,226, by Benjamin P. Baker and assigned to the assignee of the instant application.

Cooperable with the two movable contacts 45 is a pair of stationary contacts 55, supported by upstanding brackets 56 from an interiorly disposed insulating tube 57. The insulating tube 57 is disposed interiorly of a surrounding, tubular, weatherproof casing 58, made of any suitable weatherproof material, such as porcelain.

The right hand end of the porcelain casing 58, as viewed in FIG. 4, may be supported from an end plate 59, the latter being supported at the upper end of an insulator column 60.

An enclosing end cap 61 is provided with an overpressure valve 62, biased to the closed position by a coiled spring 63, and arranged to open upon excessive pressure within the region 64 within casing 58.

Situated adjacent the contacting ends of the stationary contacts 55 are orifice structures 3, which may assume the form set out in FIGS. 1–3 of the drawings. As more particularly illustrated in FIG. 5 of the drawings, the orifice structure 3 assumes the form shown in FIG. 2. The inlet tube 12 leading to the orifice structures 3, as shown in FIG. 5, communicates with a relief valve, generally designated by the reference numeral 65. With reference to FIG. 5, it will be noted that the relief valve 65 includes a valve 66, biased by a spring 67 over a valve seat 68, communicating with an inlet tube 69. The inlet tube 69 leads to the operating cylinder 32.

A compressor 71 recompresses the gaseous fluid, such as gaseous $SF_6$ in the region 64 within casing 58, and sends it in liquid form through a discharge tube 72 back into the reservoir 22. Preferably, a filter 73 is employed in the inlet line 74 which leads from the casing 54.

The crank arm 53 is pivotally connected, as at 75, to a vertically extending, insulating, operating rod 76, the latter being connected to any suitable external operating mechanism, located, preferably, at ground potential. The insulating reciprocally movable, upstanding, operating rod 76, in addition, is pivotally connected, as at 77, to a bell-crank lever 78, the latter being rotatable about a fixed shaft 79, as more clearly shown in FIG. 6 of the drawings. The upper end of one arm 80 of the bell-crank lever 78 is pivotally connected by a slotted connection, as at 81, to the left-hand end of the piston rod 30.

The operation of the circuit interrupter 21 will now be described. In the closed-circuit position of the interrupter 21, the electrical circuit therethrough extends from the terminal 82, through the centrally disposed terminal stud 43, through flexible connector 44 to the left-hand movable contact 45. The circuit then extends through the left-hand stationary contact 55, through flexible connector 83 to the right-hand movable contact 45. The circuit continues by way of the right-hand stationary contact 55, through a flexible connector 84 to conducting end plate 59. The circuit passes from end plate 59 to the conducting closure cap 61 to a line terminal stud 85, to which the external line connection may be made.

When it is desired to effect the opening operation of the circuit interrupter 21, suitable operating mechanism, not shown, connected to the insulating operating rod 76, effects downward opening motion of the same. The downward movement of the operating rod 76 effects, through the crank arms 51, 53 leftward movement of the insulating rod 49 and hence of the operating rods 47. The insulating operating rods 47 being connected to the two movable contacts 45, by way of the upstanding supports 46, causes leftward separating, opening motion of the contacts 45 away from the two stationary contacts 55, drawing a pair of serially related arcs 86, 87 therebetween.

The downward movement of the operating rod 76 also effects through the bell-crank 78 (FIG. 6) rightward driving movement of the piston rod 30, and hence of the impulse piston 29. This will cause a forcing, or driving of liquid $SF_6$ through the inlet tube 69 to the two relief valves 65, where, upon the attainment of adequate pressure, say of the order of 1200 p.s.i.g., the pressure will uncover the valve seats 68, and permit liquid $SF_6$ to pass through the inlet tubes 12 into the annular manifolds 11, through the inlet tubes 12 into the annular manifolds 11, through inlet or injecting passages 10 and into the arcs 86, 87, in the manner illustrated in FIG. 2, of the drawings.

By way of example only, and not by way of limitation, considering $SF_6$ as the interrupting medium, the pressures throughout the interrupter 21 may conceivably be as follows: pressure in region 64, throughout the interior of porcelain casings 39, 40 and 58, 45 p.s.i.g.; pressure in the inlet tube 69, 1200 p.s.i.g.; pressure in the manifold 11, 400 p.s.i.g.; pressure about the tip of the moving contacts 45 adjacent the orifice structures 3, 60 p.s.i.g.; and pressure in the arcing space, 150 p.s.i.g. The vapor pressure in the region 24 of the reservoir 22 may vary from 20 p.s.i.g. at −40° F., 300 p.s.i.g. at 70° F., to 700 p.s.i.g. at 150° F. ambient temperature.

The injection of the liquid $SF_6$ at 400 p.s.i.g., into the arcs 86, 87 readily effects the extinction thereof, and continued opening movement of the operating rod 76 through the linkage brings the movable contacts 45 to their fully open-circuit position, not shown.

To effect the closing of the circuit interrupter 21, the operating rod 76 is moved upwardly by any suitable mechanism (not shown) to effect through the crank arms 51, 53 closing motion of the operating rods 47. This carries the movable contacts 45 to their closed position in engagement with the stationary contacts 55, completing the electrical circuit through the interrupter 21. The upward movement of the operating rod 76 effects, through the bell-crank 78 (FIG. 6), leftward recharging movement of the piston rod 30 and impulse piston 29, the check-valve plate 34 uncovering the aperture 33, and causing a measured quantity of liquid $SF_6$ to be admitted into the region 36 within operating cylinder 32.

Thus, FIGS. 4–6 illustrates a mechanical injector type of device adapted to a bushing-type circuit breaker 21, in which the $SF_6$ container 22 is mounted at ground potential and above the level of the interrupters 3. An insulating tube 69 leads from the container 22 to the interrupting elements 3, which may be as shown in FIGS. 1, 2 or 3. The tube 69 terminates in the interrupters 3, as shown. The impulse injector 28 and the high-pressure relief valves 65 are located in the line 69 between the $SF_6$ container 22 and the interrupters 3. The relief valve 65 should be near the interrupters 3 and may be set to open at 800 p.s.i.g. The injector 28, designed to deliver 1200 p.s.i.g., may be located any place in the line 69 if there is no place where gas pockets can form between the injector 28 and relief valve 65. Lower injector pressures may be used if the relief valves are of a type that requires a high pressure to open, and a lower differential pressure to keep open. The injector piston 29 is mechanically connected directly to the operating mechanism, which operates the contacts 45, 55. The piston 29 may carry a check valve 34 to speed up refilling on the closing stroke.

The entire structure is filled with $SF_6$ gas at approximately 45 p.s.i.g. for insulation purposes, and the compressor 71 may take the gas at 45 p.s.i.g., drawing it through the filter 73 and deliquefying the gas. The compressor 71 may then force the reliquefied $SF_6$ through the discharge tube 72 into the reservoir 22, as shown in FIG. 4 of the drawings.

FIG. 7 shows somewhat diagrammatically how an accumulator reservoir 88 can be used to maintain high-driving pressure even at low ambient temperatures, where the $SF_6$ would condense, or have low vapor pressure. In conjunction with a suitable valve, this may be used to replace the mechanical injector, or impulse system shown in FIG. 5. As illustrated in FIG. 7, an inlet valve, generally designated by the reference numeral 89, may include a valve 90 biased by a compression spring 91 to the closed position over a seat 92, associated with an inlet feed tube 93. The valve 89 may be cam-operated through a cam surface 94 carried by one of the insulating operating rods 47.

During the opening operation, the cam surface 94 forces downwardly a cam roller 95, carried by an arm 96 pivoted to a rotatable ram 97 and effecting opening of the inlet valve 90. The inlet valve 89 may be so arranged that the cam 94 will not effect the opening of the inlet valve 90 during the closing stroke of the modified type of interrupter, generally designated by the reference numeral 98.

Thus, rightward closing movement of the operating rods 47 and cam surface 94 will be ineffective to cause opening of the valve 90, since during this movement the arm 96 will rotate about its pivotal connection 99 with arm 97 against the opposition afforded by a tension spring 100.

Preferably, to economize the use of the liquid $SF_6$, a series-current control valve 101 is positioned in inlet tube 93 to control the opening through inlet tube 93 as a function of the magnitude of current being interrupted by the circuit interrupter 98. A cylinder 102 of nitrogen gas $N_2$ under pressure is provided, controlled by a valve 103, to maintain a relatively high pressure in the space 104 above a mechanical, movable diaphragm 105 within accumulator reservoir 88.

The liquid $SF_6$ may be disposed in the region 106 below diaphragm 105, with $SF_6$ gas in the space 107 above the meniscus 108 separating the liquid and gas phase of the $SF_6$.

The walls of the reservoir 88 are provided with integrally formed stops 109, which limit the downward travel of the diaphragm 105. Also, a float 110 may be provided to sound an alarm, and to block breaker operation if the liquid $SF_6$ should reach this minimum value.

Thus, FIG. 7 illustrates how a suitable valve 89 may be used to replace the injector system 28, shown in FIG. 4. The valve 90 may be biased to the closing position by the spring 91 and opened by a cam surface 94 attached to the contact operating mechanism, so that the size of the pipe 93 or valve 90 will determine the rate of use of the $SF_6$ and the time for the motion of the movable contact 45 will determine the amount of $SF_6$ used. The cam 94 can be arranged so that the valve will not be opened during the closing stroke.

A master valve 101 may be used in series with the foregoing inlet valve 89, the former being responsive to current so that smaller amounts of $SF_6$ will be used when interrupting small values of current.

With the arrangement shown in FIG. 7, the accumulator 88 takes the place of the mechanical injector 28 by maintaining the necessary minimum pressure on the $SF_6$ regardless of ambient temperature.

Assume an ambient temperature variation between 150° F. and −40° F. The vapor pressure of $SF_6$ will vary from 700 p.s.i.g. to 40 p.s.i.g. Since anything appreciably less than 300 p.s.i.g. would make injection unsatisfactory, means must be found to mechanically maintain the $SF_6$ under high pressure regardless of temperature. Here it is accomplished by a pneumatic means in the form of nitrogen gas ($N_2$) or other permanent gas under pressure, above a flexible piston or other diaphragm 105. The pressure exerted by the nitrogen is affected only moderately over this temperature range. However, the pressure does decrease as it expands in response to withdrawal of the $SF_6$. In charging the accumulator 88 for the first time, at say 70° F., nitrogen would be pumped in the top to 300 p.s.i.g. with the baffle on the stop 109. Then, $SF_6$ should be pumped in, as a liquid, until the nitrogen pressure is 700 p.s.i.g. Normally diaphragm 105 will rest on the liquid face 108 and there would be no $SF_6$ gas above the liquid, though as the temperature rises to slightly above 150° F., some vapor may form above the liquid $SF_6$ and the pressure asserted by the nitrogen will increase slightly. If the temperature drops to a −40° F., the pressure asserted by the nitrogen will decrease a moderate amount, resulting from the temperature drop. If the liquid $SF_6$ is then used down near the stop 109, the pressure will never drop much below 300 p.s.i.g. even though the temperature may then drop to a −40° F. At any other intermediate point in the $SF_6$ liquid usage, temperature variations will only cause a change in the relative amounts of $SF_6$ gas and liquid, but not appreciably effect the pressure.

The larger the accumulator 88, the more liquid $SF_6$ may be used without dropping the pressure below the permissible value. The larger the volume of nitrogen, the smaller the variation in pressure as a function of both temperature and $SF_6$ usage.

The inlet valve 90 should be located near the interrupter 3 so that any liquid discharged through the valve 90 is immediately available for arc extinction instead of filling the tube between the valve 90 and the interrupters 3. The float gauge 110 is employed to sound an alarm, and to block the operation of the circuit interrupter, if the liquid should reach this minimum value.

FIG. 8 diagrammatically illustrates a scheme similar to that shown in FIG. 7 except that instead of using an accumulator 88, the $SF_6$ is stored in a reservoir 111, and heat is applied as necessary to the reservoir 111 to maintain a temperature of 70° F. or above. In this case, the vapor pressure will never be less than 300 p.s.i.g. The heating coil 112 may be connected to any suitable electrical source and surrounds the reservoir 111. A sump 113 collects discharged $SF_6$ gas from the interior of the interrupter, such as the discharge space 64 of FIG. 4. From the sump 113 a compressor 71 may be utilized to reliquefy the gas, and to send it back through pipe 72 into the reservoir 111 in the liquid phase.

If the ambient temperature rises to 150° F., the vapor pressure of the $SF_6$ in the space 24 will increase to 700 p.s.i.g. as long as there is still usable $SF_6$ liquid 23 to be vaporized in the reservoir 111. As a result, the pressure operating range will be between 300 and 700 p.s.i.g. regardless of the ambient temperature conditions.

It will be observed, viewing FIG. 8, that a conduit 114 is connected to the upper end of the reservoir 111 to the $SF_6$ vapor space 24. An electro-magnetically actuated closing valve 115 is operated by energization of a closing coil 116. A second heating coil 117 surrounds a part of the conduit 114 to maintain the temperature of the vapor within the conduit 114 to at least the minimum temperature of 70° F.

The lower end of the conduit 114 feeds into the left-hand end of an operating cylinder 118, within which reciprocally moves a contact piston 119. A piston rod 120, connected to the operating piston 119 at one end thereof, has the other end 121 connected to a movable contact 45, not shown. An accelerating compression spring 122 bearing against a plate 123, affixed to the piston rod 120 serves to bias the piston rod 120, and hence the movable contact 45, to the open-circuit position.

The lower end of the conduit 114 is also connected to a tripping valve 125, which is electrically actuated by a tripping coil 126. A conduit 127 leads from the tripping valve 125 to the sump 113. If needed, a third heating coil 128 surrounds the operating cylinder 118 to maintain the temperature of the $SF_6$ vapor therein to the minimum 70° F. level.

The operation of the modified type of circuit interrupter 129 will now be described, with reference being had to the circuit interrupter 98 of FIG. 7. Since the heating coils 112, 117, and 128 maintain the temperature of the liquid $SF_6$ 23 and the vapor 24 at the minimum 70° F. level, as mentioned, the pressure operating range will be between 300 and 700 p.s.i.g. regardless of the surrounding ambient temperature conditions.

To effect the closing of the interrupter 129, the closing coil 116 may be energized, by any suitable control, to thereby effect the opening of the closing valve 115. This will permit $SF_6$ vapor, from the vapor space 24, to pass downwardly through the conduit 114 and into the operating cylinder 118, the opening tripping valve 125 remaining closed during this time. The entrance of $SF_6$ vapor into the operating cylinder 118, during such actuation of the closing valve 115, will effect rightward, or closing movement of the operating piston 119. As a result, the piston rod 120 will effect closing of the movable contact 45, not shown, and, in addition charging of the opening, accelerating compression spring 122. The contacts, being closed, will permit current to pass through the interrupter 129.

To effect the opening of the modified type of interrupter 129, the closing valve 115 is closed, and the opening, tripping valve 125 is opened by the energization of the tripping coil 126. This will discharge the $SF_6$ vapor under pressure within the lower end of the conduit 114 and the left-hand end of the operating cylinder 118 into the sump 113. The opening, accelerating compression spring 122 will then effect the opening of the movable contact 45 (FIG. 7) and a suitable cam structure 94, as illustrated in FIG. 7, will bring about the opening of a valve 90 to effect arc extinction. The breaker may be closed by operating valve 115, latched closed, and the gas dumped by opening valve 125, in which the breaker will be opened in the usual way by unlatching a mechanism. The movable contact 45 will move to its fully open-circuit position, as caused by the spring 122, and the circuit interrupter 129 is in readiness for a subsequent closing operation.

It is to be observed that there are many important advantages of the structure described over other types of interrupters previously employed in the art. First, as disclosed in FIG. 8, there is a light operating mechanism for the contacts. Secondly, the valve 90, controlling the flow of liquid $SF_6$, opens and closes, being controlled by motion of the movable contact 45. Thirdly, the discharge gas is cleaned and pumped back into the high-pressure system. Fourthly, the $SF_6$ vapor may be used to operate the contacts, as shown in FIG. 8, thus not requiring a separate hydraulic system. Fifthly, a large number of operations are possible in an emergency by having the overpressure valve 62 (FIG. 4) discharge exhaust gas to the surrounding atmosphere, if the pump 71 cannot keep up in removing $SF_6$ gas from the region 64 within the interrupter by compressing it to a liquid and restoring it to the $SF_6$ reservoir.

In addition, there is a sixth advantage to the structure shown, in that the master valve 101, in series with the current passing through the interrupter, is responsive to fault current, so that the full amount of liquid $SF_6$ is used only for heavy-fault current interruption. Seventh, the dielectric strength of the $SF_6$ medium is proportional to its density (temperature and pressure). Since the back pressure is fixed by the arc history, and the temperature is a function of evaporation, dielectric strength should develop rapidly after arcing or as the current decreases.

An eighth advantage of the structures shown is that smaller and lighter porcelains and associated parts may be used, since large puffers for compressing $SF_6$ gas are not required. A ninth advantage is that when inspecting or servicing the interrupters, most of the gaseous $SF_6$, within the interior breaker space 64 (FIG. 4), can be pumped and stored in the $SF_6$ liquid reservoir. A tenth advantage is that the amount of liquid $SF_6$ used per interruption does not necessarily have to be metered, or measured accurately, as the excess will be pumped back into the system, or blown into the atmosphere if operations are too frequent. In addition, it will be noted that a temporary elevation of the pressure immediately following arc interruption will add to the dielectric strength, when it is most needed.

It is to be clearly understood that with reference to the foregoing structures, the present invention is not limited by the previously recited dimensions, temperatures or pressures. These values were chosen for purposes of illustration, and are, therefore, not applicable to all breaker ratings. Also, it is to be understood that although the invention was illustrated in FIG. 4 as applied to a single-bushing type of interrupter, it is equally aplicable to other types of breaker constructions, which may be similar to those generally associated with the compressed-gas circuit interrupter art.

Figure 9:
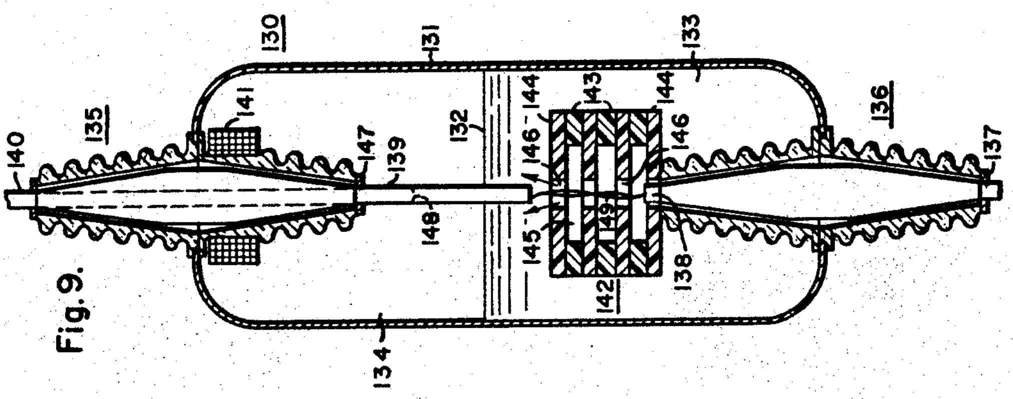
FIG. 9 is a vertical sectional view of a modified type of circuit interrupter employing a pool of liquefied gas, with the contact structure being shown in the partially open-circuit position.

FIG. 9 shows a modified type of circuit interrupter 130 of a type considerably different from the previously described structures. With reference to FIG. 9, it will be observed that there is provided a metallic container 131 filled to the level 132 with liquid $SF_6$ 133. The $SF_6$ vapor space 134 is at the upper end of the casing 131, as shown. Two bushings 135, 136 extend through opposite ends of the container 131 in a sealed manner. The lower bushing 136 accommodates a terminal stud 137, to the upper end of which is affixed a stationary contact 138.

Cooperable with the stationary contact 138 is a reciprocally movable, moving contact 139, which slides in a sealed manner, within the upper bushing 135. The upper end 140 of the movable contact 139 may be connected to any suitable external mechanism, not shown.

A current transformer 141 may be associated with upper bushing 135 to measure the flow of current passing through the interrupter 130 for the control of suitable relaying operations. Also a current transformer may be associated with the lower bushing for relaying convenience.

Associated with the upper end of the lower bushing 136 is an interrupting structure 142, including a plurality of insulating rings 143 interspersed between round, apertured plates 144. The rings 143 cooperates with the apertured circular plates 144 to provide annular pockets 145 within the interrupting structure 142. The movable contact 139 moves longitudinally through the centrally disposed orifices 146 provided by the several apertured plates 144.

It will be noted that the container 131 is filled with liquid $SF_6$ at such a pressure, so that at 150° F. the liquid level 132 will not fall below the top of the interrupting structure 142 The movable contact 139 is operated through a suitable gas-tight seal 147, and in the open-circuit position is disposed above the liquid level 132, as indicated by the dotted line 148.

The vapor pressure may vary from 20 p.s.i.g. at −40° F. to 700 p.s.i.g. at +150° F., without appreciably affecting the operability of the interrupter 130 or the dielectric strength of the space 134 above the liquid level 132.

The interrupting structure 142 may consist of an insulating block with interstices, or pockets 145, through which the arc 149 may be drawn. The heat of the arc converts the liquid to a gas, which blasts the arc 149 as it passes through the orifices 146.

In the closed-circuit position of the interrupter 130, the heat generated by the contacts 138, 139 carrying large values of current will vaporize a portion of the liquid $SF_6$, which vapor will carry the heat to the upper part of the chamber wall 131, where the vaporized $SF_6$ will be condensed and returned to the liquid body or pool, thus permitting lighter and less expensive current carrying parts.

From the foregoing description of the modified type of interrupter 130, illustrated in FIG. 9, it will be observed that we have produced a completely enclosed, small and compact breaker, with a large current-carrying capacity and having a large interrupting rating. This breaker, in addition, has a very long life and is highly effective in service.

It will, of course, be apparent that although the container 131 is disclosed as being of conducting material with bushings 135, 136 at each end, as shown, the container 131 may be made of an insulating material, and the bushings 135, 136 omitted.

Also, the moving contacts 139 may be located at the bottom and the arc drawn from the vapor at the upper end of the container 131 down into the liquid body or pool 133 itself. This may be preferable for large values of current, but possibly might be somewhat susceptible to restrikes when interrupting leading currents.

Figure 10:
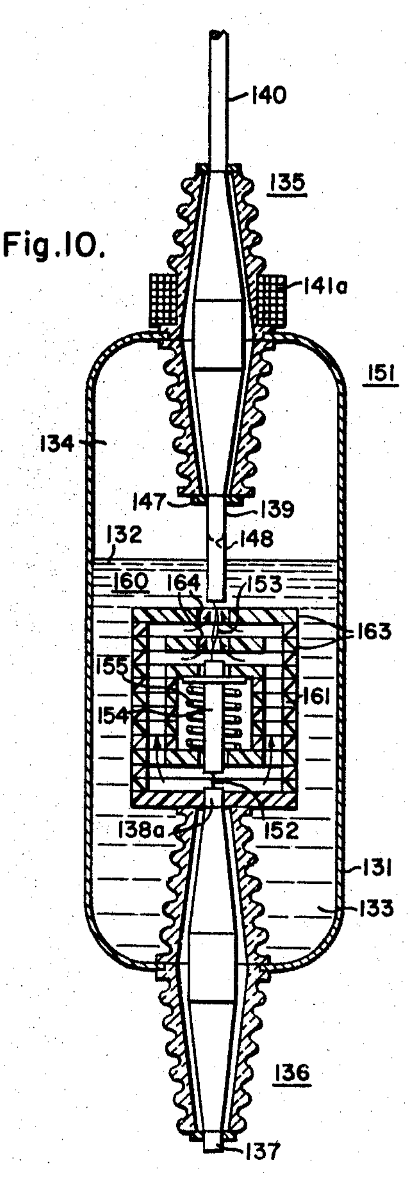
FIG. 10 shows still another modified type of circuit interrupter with the contacts in the partially open-circuit position.

FIG. 10 illustrates a modified type of liquid pool interrupter, generally designated by the reference numeral 151, utilizing the pressure generated at a pressure-generating arc 152 to force liquid $SF_6$ toward an interrupting arc 153.

The pressure generating arc 152 is established between a stationary contact 138*a* and an intermediate contact 154, the latter being biased by a spring 155 to its open position.

The interrupting arc 153 is established between the intermediate contact 154 and the upper movable contact 139. The interrupting structure 160 consists of an enclosure 161 comprising a superimposed set of insulating plates, held compressed by tie rods, not shown. One or more upper plates 163 provide orifices 164 through which the interrupting arc 153 is drawn. Arc extinction occurs in a manner similar to that discussed in connection with FIG. 9, with the exception that here a serially-related pressure-generating arc 152 is drawn. The current transformer 141*a* here is mounted externally to the casing 131 for the convenience of removal from the bushing 135.

From the foregoing description of the present invention, it will be apparent that there are disclosed novel types of circuit interrupters utilizing liquefied gas injected into the arcing zone. Although liquefied $SF_6$ has been used as an example of a possible liquefied gas, in describing the structures, it is to be clearly understood that liquefied selenium hexafluoride, or any one or a mixture of two or more of the liquefied gases enumerated above in the objects of the present invention may be employed in substitution of liquid $SF_6$.

The various gases hereinbefore enumerated , which are suitable for use in interrupters of the type considered, have similar properties and characteristics as set out in the following table.

| | Boiling Point, ° C. | Vapor Pressure, lbs./sq.in. gauge at 20° C. | Dielectric Strength Compared With Air or $N_2$ |
|---|---|---|---|
| $CO_2$ | −78 | 830 | 0.9 |
| $SO_2$ | −10 | 35 | 2.0 |
| $SF_6$ | −63.8 | 300 | 2.2 |
| $SeF_6$ | −34.5 | ---------- | 2.9 |
| $SOF_2$ | −30 | 160 | 2.5 |
| $CCl_2F_2$ | −28 | 68 | 2.4 |
| $ClO_3F$ | −47.5 | 139 | 3.0 |
| $C_2F_6$ | −78 | ---------- | 1.8 |
| $C_3F_8$ | −37 | ---------- | 2.0 |
| $CClF_3$ | −81.5 | 325 | 1.4 |
| $CF_3Br$ | −58 | 195 | 1.25 |

Although the foregoing liquefied gases may be used to advantage, exceptional and unusual performance is obtained with liquid $SF_6$ and liquid $SeF_6$, since the gaseous phase of these two materials are so highly effective in arc interruption and high dielectric insulation.

It is stressed that an important feature of the invention is that no powerful mechanism is required to effect sudden compression of a gas, since advantage is taken of the initial energy put into the liquefied gas during the initial liquefying operations. Although the compressor 71 has been illustrated for the purpose of effecting reliquefaction of the gas, this may be eliminated and the gas exhausted to atmosphere. It will, of course, be apparent that if it is eliminated, the entire mechanical effort required may be exceedingly light, having only to effect contact separation and valve opening for the admission of liquefied gas into the arcing zone.

Although the orifice structure of FIG. 2 of the drawings was applied to the circuit interrupters, 21, 98 and 129, it is to be understood that the orifice structure of either FIG. 1 or FIG. 3 could be employed, instead of the orifice structure of FIG. 2.

It is furthermore to be noted that in the structure of the present invention, the interrupting arc is drawn immediately adjacent, and in close proximity to the point of injection of the liquefied gas.

Although there have been illustrated and described various interrupting structures, it is to be clearly understood that the same were merely for the purpose of illustration, and that changes and modifications may readily be made therein by those skilled in the art, without departing from the spirit and scope of the invention.

We claim as our invention:

1. A fluid-blast circuit interrupter including a pair of separable contacts separable to establish an arc, an orifice member associated with one of said contacts to direct fluid flow into the arc, means defining a manifold at least partially surrounding said orifice member, means providing an inlet opening to said manifold, means for forcing at least one liquefied gaseous fluorine compound selected from the group consisting of $SeF_6$, $SF_6$, $SOF_2$, $C_2F_6$, $C_3F_8$, $ClO_3$, $CF_3Br$, $CCl_2F_2$, and $CClF_3$ through said inlet opening and into the manifold, a plurality of inlet apertures spaced circumferentially around said orifice member and extending through the same for feeding fluid into the arc, and said inlet apertures in addition extending axially of said orifice member to disseminate the entrance flow of fluid into the arc stream.

2. A circuit interrupter including a metallic casing, said metallic casing included a pool of at least one liquefied gaseous fluorine compound selected from the group consisting of $SeF_6$, $SF_6$, $SOF_2$, $C_2F_6$, $C_3F_8$, $ClO_3F$, $CF_3Br$, $CCl_2F_2$, and $CClF_3$, a pair of insulating bushings extending into opposite ends of said metallic casing, a stationary contact carried adjacent the inner end of one of said bushings within the pool of the liquefied gaseous fluorine compound, a cooperable movable intermediate contact separable from said stationary contact to establish a pressure-generating arc, a cooperable second movable contact movable free of the pool of the liquefied gaseous fluorine compound in the fully open-circuit position, said second movable contact being cooperable with the movable intermediate contact to establish an interrupting arc, means for forcing fluid flow from said pressure-generating arc toward said interrupting arc to assist in effecting extinction of the same, and said second movable contact being slidable within the other of said bushings.

3. A circuit interrupter including a metallic casing, said metallic casing included a pool of at least one liquefied gaseous fluorine compound selected from the group consisting of $SeF_6$, $SF_6$, $SOF_2$, $C_2F_6$, $C_3F_8$, $ClO_3F$, $CF_3Br$, $CCl_2F_2$, and $CClF_3$, a pair of insulating bushings extending into opposite ends of said metallic casing, a stationary contact carried adjacent the inner end of one of said bushings within the pool of the liquefied gaseous fluorine compound, a cooperable movable intermediate contact separable from said stationary contact to establish a pressure-generating arc, a cooperable second movable contact movable free of the pool of the liquefied gaseous fluorine compound in the fully open-circuit position, said second movable contact being cooperable with the movable intermediate contact to establish an interrupting arc, means defining an interrupting orifice structure disposed adjacent said interrupting arc, means for forcing fluid flow from said pressure-generating arc into said interrupting orifice structure to assist in effecting extinction of the interrupting arc, and said second movable contact being slidable within the other of said bushings.

4. A fluid-blast circuit interrupter including contact means for establishing an arc, operating means for actuating the contact means, compressed-fluid reservoir means containing at least one liquefied gaseous fluorine compound selected from the group consisting of $SeF_6$, $SF_6$, $SOF_2$, $C_2F_6$, $C_3F_8$, $ClO_3F$, $CF_3Br$, $CCl_2F_2$, and $CClF_3$, means for maintaining said liquid at a sufficient driving pressure to enable it to be forced into the arc stream, said maintaining means including a different gaseous material under high pressure, conduit means interconnecting said compressed-fluid reservoir means with said arc, blast-valve means responsive to the opening operation of said operating means for releasing a blast of liquefied fluid into the arc through said conduit means to assist in effecting the extinction of the same, and a master control valve disposed in said conduit means responsive to the magnitude of the current being interrupted to control the amount of liquid passing through said conduit means, the master control valve functioning to permit more liquid to pass through said conduit means during heavy-current interruption than during light-current interruption.

5. A circuit interrupter including a metallic casing, said metallic casing included a pool of at least one liquefied gaseous fluorine compound selected from the group consisting of $SeF_6$, $SF_6$, $SOF_2$, $C_2F_6$, $C_3F_8$, $ClO_3F$, $CF_3Br$, $CCl_2F_2$, and $CClF_3$, a pair of insulating bushings extending into opposite ends of said metallic casing, a stationary contact carried adjacent the inner end of one of said bushings within the pool of the liquefied gaseous fluorine compound, a cooperable movable intermediate contact separable from said stationary contact to establish a pressure-generating arc, a cooperable second movable contact movable free of the pool of the liquefied gaseous fluorine compound in the fully open-circuit position, said second movable contact being cooperable with the movable intermediate contact to establish an interrupting arc, interrupting means for forcing fluid flow from said pressure-generating arc toward said interrupting arc to assist in effecting extinction of the same, said interrupting means defining a plurality of spaced orifices through which the interrupting arc is drawn, and said second movable contact being slidable within the other of said bushings.

6. A circuit interrupter including a metallic casing, said metallic casing included a pool of at least one liquefied gaseous fluorine compound selected from the group consisting of $SeF_6$, $SF_6$, $SOF_2$, $C_2F_6$, $C_3F_8$, $ClO_3$, $CF_3Br$, $CCl_2F_2$, and $ClF_3$, a pair of insulating bushings extending into opposite ends of said metallic casing, a stationary contact carried adjacent the inner end of one of said bushings within the pool of the liquefied gaseous fluorine compound, a cooperable movable intermediate contact separable from said stationary contact to establish a pressure-generating arc, a cooperable second movable contact movable free of the pool of the liquefied gaseous fluorine compound in the fully open-circuit position, said second movable contact being cooperable with the movable intermediate contact to establish an interrupting arc, means defining an interrupting orifice structure disposed adjacent said interrupting arc and wholly supported by the inner end of said one bushing, means for forcing fluid flow from said pressure-generating arc into said interrupting orifice structure to assist in effecting extinction of the interrupting arc, and said second movable contact being slidable within the other of said bushings.

7. A fluid-blast circuit interrupter including contact means for establishing an arc, operating means for actuating the contact means, compressed-fluid reservoir means containing at least one liquified gaseous fluorine compound selected from the group consisting of $SeF_6$, $SF_6$, $SOF_2$, $C_2F_6$, $C_3F_8$, $ClO_3F$, $CF_3Br$, $CCl_2F_2$, and $CClF_3$, means for maintaining said liquid at a sufficient driving pressure to enable it to be forced into the arc stream, said maintaining means including a different gaseous material under high pressure, conduit means interconnecting said compressed-fluid reservoir means with said arc, said operating means including a cam, cam-operated blast-valve means responsive to the opening operation of said operating means and said cam for releasing a blast of liquefied fluid into the arc through said conduit means to assist in effecting the extinction of the same, and a master control valve disposed in said conduit means responsive to the magnitude of the current being interrupted to control the amount of liquid passing through said conduit means, the master control valve functioning to permit more liquid to pass through said conduit means during heavy-current interruption than during light-current interruption.

8. A fluid-blast circuit interrupter including a pair of separable contacts separable to establish an arc, one of said contacts being relatively fixed, an orifice member surrounding said one contact and extending away from the face thereof to direct fluid flow into the arc, means defining a manifold at least partially surrounding said orifice member, means providing an inlet opening to said manifold, means for forcing at least one liquefied gaseous fluorine compound selected from the group consisting of $SeF_6$, $SF_6$, $SOF_2$, $C_2F_6$, $C_3F_8$, $ClO_3F$, $CF_3Br$, $CCl_2F_2$, and $CClF_3$ through said inlet opening and into the manifold, a plurality of inlet apertures spaced circumferentially around said orifice member and extending through the same for feeding fluid into the arc, and said inlet apertures in addition extending axially of said orifice member to disseminate the entrance flow of fluid into the arc stream.

9. A circuit interrupter including a metallic casing, said metallic casing included a pool of at least one liquefied gaseous fluorine compound selected from the group consisting of $SeF_6$, $SF_6$, $SOF_2$, $C_2F_6$, $C_3F_8$, $ClO_3F$, $CF_3Br$, $CCl_2F_2$, and $CClF_3$, a pair of insulating bushings extending into opposite ends of said metallic casing, a stationary contact carried adjacent the inner end of one of said bushings within the pool of the liquefied gaseous fluorine compound, a cooperable movable intermediate contact separable from said stationary contact to establish a pressure-generating arc, a cooperable second movable contact movable free of the pool of the liquefied gaseous fluorine compound in the fully open-circuit position, said second movable contact being cooperable with the movable intermediate contact to establish an interrupting arc, interrupting means for forcing fluid flow from said pressure-generating arc toward said interrupting arc to assist in effecting extinction of the same, said interrupting means including a plurality of contiguously-disposed insulating plates defining spaced orifices for said interrupting arc, and said second movable contact being slidable within the other of said bushings.

10. A circuit interrupter including a metallic casing, said metallic casing included a pool of at least one liquefied gaseous fluorine compound selected from the group consisting of $SeF_6$, $SF_6$, $SOF_2$, $C_2F_6$, $C_3F_8$, $ClO_3F$, $CF_3Br$, $CCl_2F_2$, and $CClF_3$, a pair of insulating bushings extending into opposite ends of said metallic casing, a stationary contact carried adjacent the inner end of one of said bushings within the pool of the liquefied gaseous fluorine compound, a cooperable movable intermediate contact separable from said stationary contact to establish a pressure-generating arc, a cooperable second movable contact movable free of the pool of the liquefied gaseous fluorine compound in the fully open-circuit position, said second movable contact being cooperable with the movable intermediate contact to establish an interrupting arc, means at least partially of insulating material defining a pressure-generating chamber and a communicating interrupting orifice structure disposed adjacent said interrupting arc, means for forcing fluid flow from said pressure-generating arc into said interrupting orifice structure to assist in effecting extinction of the interrupting arc, and said second movable contact being slidable within the other of said bushings.

11. A fluid-blast circuit interrupter including contact means for establishing an arc, operating means for actuating the contact means, compressed-fluid reservoir means containing at least one liquefied gaseous fluorine compound selected from the group consisting of $SeF_6$, $SF_6$, $SOF_2$, $C_2F_6$, $C_3F_8$, $ClO_3F$, $CF_3Br$, $CCl_2F_2$, and $CClF_3$, means for maintaining said liquid at a sufficient driving pressure to enable it to be forced into the arc stream, said maintaining means including a different gaseous material under high pressure, conduit means interconnecting said compressed-fluid reservoir means with said arc, said operating means including a cam, cam-operated blast-valve means responsive to the opening operation of said operating means and said cam for releasing a blast of liquefied fluid into the arc through said conduit means to assist in effecting the extinction of the same, means rendering said cam ineffective during a closing operation, and a master control valve disposed in said conduit means responsive to the magnitude of the current being interrupted to control the amount of liquid passing through said conduit means, the master control valve functioning to permit more liquid to pass through said conduit means during heavy-current interruption than during light-current interruption.

12. A fluid-blast circuit interrupter including a pair of separable butt contacts separable to establish an arc, an orifice member associated with one of said butt contacts to direct fluid flow into the arc, means defining a manifold at least partially surrounding said orifice member, means providing an inlet opening to said manifold, means including a pressurized gas for forcing at least one liquefied gaseous fluorine compound selected from the group consisting of $SeF_6$, $SF_6$, $SOF_2$, $C_2F_6$, $C_3F_8$, $ClO_3F$, $CF_3Br$, $CCl_2F_2$, and $CClF_3$ through said inlet opening and into the manifold, a plurality of inlet apertures spaced circumferentially around said orifice member and extending through the same for feeding fluid into the arc, and said inlet apertures in addition extending axially of said orifice member to disseminate the entrance flow of fluid into the arc stream.

13. A circuit interrupter including a metallic casing, said metallic casing included a pool of at least one liquefied gaseous fluorine compound selected from the group consisting of $SeF_6$, $SF_6$, $SOF_2$, $C_2F_6$, $C_3F_8$, $ClO_3F$, $CF_3Br$, $CCl_2F_2$, and $CClF_3$, a pair of insulating bushings extending into opposite ends of said metallic casing, a stationary contact carried adjacent the inner end of one of said bushings within the pool of the liquefied gaseous fluorine compound, a cooperable movable intermediate contact separable from said stationary contact to establish a pressure-generating arc, a cooperable second movable contact movable free of the pool of the liquefied gaseous fluorine compound in the fully open-circuit position, said second movable contact being cooperable with the movable intermediate contact to establish an interrupting arc, interrupting means for forcing fluid flow from said pressure-generating arc toward said interrupting arc to assist in effecting extinction of the same, said interrupting means being at least partially supported from the inner end of said one bushing within the pool, and said second movable contact being slidable within the other of said bushings.

14. A circuit interrupter including a metallic casing, said metallic casing included a pool of at least one liquefied gaseous fluorine compound selected from the group consisting of $SeF_6$, $SF_6$, $SOF_2$, $C_2F_6$, $C_3F_8$, $ClO_3F$, $CF_3Br$, $CCl_2F_2$, and $CClF_3$, a pair of insulating bushings extending into opposite ends of said metallic casing, a stationary contact carried adjacent the inner end of one of said bushings within the pool of the liquefied gaseous fluorine compound, a cooperable movable intermediate contact separable from said stationary contact to establish a pressure-generating arc, a cooperable second movable contact movable free of the pool of the liquefied gaseous fluorine compound in the fully open-circuit position, said second movable contact being cooperable with the movable intermediate contact to establish an interrupting arc, means defining an interrupting orifice structure disposed adjacent said interrupting arc and wholly immersed within the pool, means for forcing fluid flow from said pressure-generating arc into said interrupting orifice structure to assist in effecting extinction of the interrupting arc, and said second movable contact being slidable within the other of said bushings.

15. A fluid-blast circuit interrupter including contact means for establishing an arc, means defining an orifice structure adjacent said arc, operating means for actuating the contact means, compressed-fluid reservoir means containing at least one liquefied gaseous fluorine compound selected from the group consisting of $SeF_6$, $SF_6$, $SOF_2$, $C_2F_6$, $C_3F_8$, $ClO_3F$, $CF_3Br$, $CCl_2F_2$, and $CClF_3$, means for maintaining said liquid at a sufficient driving pressure to enable it to be forced into the arc stream, said maintaining means including a different gaseous material under high pressure, conduit means interconnecting said compressed-fluid reservoir means with said arc, blast-valve means responsive to the opening operation of said operating means for releasing a blast of liquefied fluid through said orifice structure and into the arc through said conduit means to assist in effecting the extinction of the same, and a master control valve disposed in said conduit means responsive to the magnitude of the current being interrupted to control the amount of liquid passing through said conduit means, the master control valve functioning to permit more liquid to pass through said conduit means during heavy-current interruption than during light-current interruption.

16. A fluid-blast circuit interrupter including a pair of separable contacts separable to establish an arc, a generally cylindrically-shaped orifice member associated with one of said contacts to direct fluid flow into the arc, said one contact substantially blocking one end of said cylindrically-shaped orifice member, means defining a manifold at least partially surrounding said orifice member, means providing an inlet opening to said manifold, means for forcing at least one liquefied gaseous fluorine compound selected from the group consisting of $SeF_6$, $SF_6$, $SOF_2$, $C_2F_6$, $C_3F_8$, $ClO_3F$, $CF_3Br$, $CCl_2F_2$, and $CClF_3$ through said inlet opening and into the manifold, a plurality of inlet apertures spaced circumferentially around said orifice member and extending through the same for feeding fluid into the arc, and said inlet apertures in addition extending axially of said orifice member to disseminate the entrance flow of fluid into the arc stream.

17. A circuit interrupter including a metallic casing, said metallic casing included a pool of at least one liquefied gaseous fluorine compound selected from the group consisting of $SeF_6$, $SF_6$, $SOF_2$, $C_2F_6$, $C_3F_8$, $ClO_3F$, $CF_3Br$, $CCl_2F_2$, and $CClF_3$, a pair of insulating bushings extending into opposite ends of said metallic casing, a stationary contact carried adjacent the inner end of one of said bushings within the pool of the liquefied gaseous fluorine compound, a cooperable movable intermediate contact separable from said stationary contact to establish a pressure-generating arc, a cooperable second movable contact movable free of the pool of the liquefied gaseous fluorine compound in the fully open-circuit position, said second movable contact being cooperable with the movable intermediate contact to establish an interrupting arc, means for forcing fluid flow from said pressure-generating arc toward said interrupting arc to assist in effecting extinction of the same, said second movable contact being slidable within the other of said bushings, and a current transformer surrounding the said other bushing externally of the metallic casing.

18. A circuit interrupter including a metallic casing, said metallic casing included a pool of at least one liquefied gaseous fluorine compound selected from the group consisting of SeF, $SF_6$, $SOF_2$, $C_2F_6$, $C_3F_8$, $ClO_3F$, $CF_3Br$, $CCl_2F_2$, and $CClF_3$, a pair of insulating bushings extending into opposite ends of said metallic casing a stationary contact carried adjacent the inner end of one of said bushings within the pool of the liquefied gaseous fluorine compound, a cooperable movable intermediate contact separable from said stationary contact to establish a pressure-generating arc, means biasing said movable intermediate contact away from the stationary contact, a cooperable second movable contact movable free of the pool of the liquefied gaseous fluorine compound in the fully open-circuit position, said second movable contact being cooperable with the movable intermediate contact to establish an interrupting arc, means defining an interrupting orifice structure disposed adjacent said interrupting arc, means for forcing fluid flow from said pressure-generating arc into said interrupting orifice structure to assist in effecting extinction of the interrupting arc, and said second movable contact being slidable within the other of said bushings.

19. A fluid-blast circuit interrupter including contact means for establishing an arc, means defining an orifice structure adjacent said arc, a manifold structure at least partially surrounding said orifice structure, operating means for actuating the contact means, compressed-fluid reservoir means containing at least one liquefied gaseous fluorine compound selected from the group consisting of $SeF_6$, $SF_6$, $SOF_2$, $C_2F_6$, $C_3F_8$, $ClO_3F$, $CF_3Br$, $CCl_2F_2$, and $CClF_3$, means for maintaining said liquid at a sufficient driving pressure to enable it to be forced into the arc stream, said maintaining means including a different gaseous material under high pressure, conduit means interconnecting said compressed-fluid reservoir means with said arc, blast-valve means responsive to the opening operation of said operating means for releasing a blast of liquefied fluid through said manifold and orifice structure and into the arc through said conduit means to assist in effecting the extinction of the same, and a master control valve disposed in said conduit means responsive to the magnitude of the current being interrupted to control the amount of liquid passing through said conduit means, the master control valve functioning to permit more liquid to pass through said conduit means during heavy-current interruption than during light-current interruption.

20. A fluid-blast circuit interrupter including a pair of separable contacts separable to establish an arc, an orifice member associated with one of said contacts to direct fluid flow into the arc, means defining a manifold at least partially surrounding said orifice member, means providing an inlet opening to said manifold, means comprising compressed nitrogen gas for forcing at least one liquefied gaseous fluorine compound selected from the group consisting of $SeF_6$, $SF_6$, $SOF_2$, $C_2F_6$, $C_3F_8$, $ClO_3F$, $CF_3Br$, $CCl_2F_2$, and $CClF_3$ through said inlet opening and into the manifold, a plurality of inlet apertures spaced circumferentially around said orifice member and extending through the same for feeding fluid into the arc, and said inlet apertures in addition extending axially of said orifice member to disseminate the entrance flow of fluid into the arc stream.

References Cited in the file of this patent

UNITED STATES PATENTS

| | | |
|---|---|---|
| 901,967 | Hewlett | Oct. 27, 1908 |
| 1,113,087 | Ball | Oct. 6, 1914 |
| 1,953,216 | Elsey | Apr. 3, 1934 |
| 2,077,429 | McMahon | Apr. 20, 1937 |
| 2,083,611 | Marshall | June 15, 1937 |
| 2,102,768 | Trencham et al. | Dec. 21, 1937 |
| 2,221,670 | Cooper | Nov. 12, 1940 |
| 2,221,671 | Cooper | Nov. 12, 1940 |
| 2,238,567 | Prince | Apr. 15, 1941 |
| 2,258,226 | Skeats | Oct. 7, 1941 |
| 2,313,580 | Rankin | Mar. 9, 1943 |
| 2,491,112 | Jansson | Dec. 13, 1949 |
| 2,757,261 | Lingal et al. | July 31, 1956 |
| 2,813,177 | Eberhard et al. | Nov. 12, 1957 |
| 2,853,540 | Camilli et al. | Sept. 23, 1958 |
| 2,900,469 | Gratzmuller | Aug. 18, 1959 |

FOREIGN PATENTS

| | | |
|---|---|---|
| 553,451 | France | Feb. 9, 1923 |
| 1,135,122 | France | Dec. 10, 1956 |
| 358,554 | Great Britain | Oct. 7, 1931 |
| 525,244 | Great Britain | Aug. 23, 1940 |
| 619,745 | Germany | Oct. 10, 1935 |
| 652,721 | Germany | Nov. 9, 1937 |
| 655,180 | Germany | Jan. 10, 1938 |
| 732,000 | Germany | Feb. 19, 1943 |
| 662,215 | Germany | July 7, 1938 |
| 99,794 | Sweden | Sept. 10, 1940 |